J. C. SEITZ.
ANTISKID TIRE CHAIN ADJUSTER.
APPLICATION FILED MAR. 14, 1916.
1,189,632.
Patented July 4, 1916.
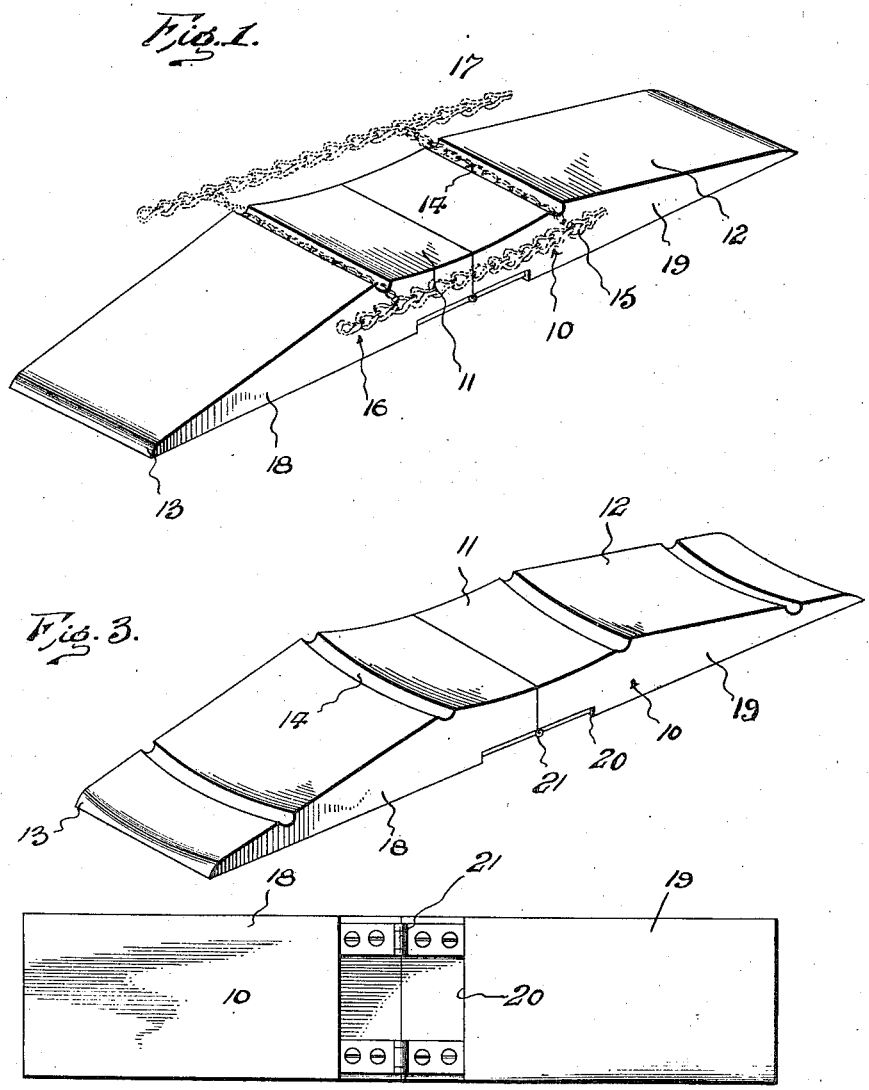
Inventor
John C. Seitz.

UNITED STATES PATENT OFFICE.

JOHN C. SEITZ, OF BUTTE, MONTANA.

ANTISKID-TIRE-CHAIN ADJUSTER.

1,189,632.　　　　Specification of Letters Patent.　　Patented July 4, 1916.

Application filed March 14, 1916.　Serial No. 84,130.

*To all whom it may concern:*

Be it known that I, JOHN C. SEITZ, a citizen of the United States, residing at Butte, in the county of Silverbow and State of Montana, have invented certain new and useful Improvements in Antiskid Tire-Chain Adjusters, of which the following is a specification.

My invention relates to new and useful improvements in anti-skid tire chain adjusters, the primary object of my invention being the provision of a supporting body adapted to be positioned in front of a vehicle wheel, whereby such wheel may be run upon and supported by the body while a tire chain is being adjusted and then run off from the body with the chain in place.

A still further object of my invention consists in providing a device of the above described character capable of supporting a portion of the chain to be applied to the wheel, as well as of supporting the wheel and so arranged that the chain will not only be supported but will be held against displacement both while the wheel is being run upon the body and while the chain is being adjusted.

A still further object of my invention consists in constructing the body of the device in such a manner that when the wheel is upon it, the periphery of the wheel will be engaged in a hollowed seat formed in the body and therefore held against any slight force tending to move it from the body.

With these and other objects in view, my invention will be more fully described, illustrated in the accompanying drawings, and then specifically pointed out in the claims which are attached to and form a part of this application.

In the drawings: Figure 1 is a perspective view of my invention; Fig. 2 is a bottom plan view; Fig. 3 is a perspective view of a modified form of construction.

Corresponding and like parts are referred to in the following description and indicated in all the views of the drawings by the same reference characters.

My improved chain adjuster, in its simplest form, includes a body, indicated as a whole by the numeral 10, which is substantially rectangular in shape, having a substantially plane surfaced lower face whereby it may rest evenly upon the ground and provided centrally with a transversely formed groove or channel 11 forming an arcuate face corresponding in curvature to the curvature of a tire with which the device is to be employed. The end portions of the body, from the front and rear edges of this face, are formed with inclined faces 12 and the terminals of the body are preferably rounded as at 13 in order that they may not be splintered or otherwise injured when the vehicle wheel carrying the tire is rolled on and off of the body. This body may be formed of any suitable material, but is preferably constructed of wood and its upper face, at either end of the curved face 11, is preferably provided with transverse grooves 14 to receive the cross chain portions 15 of any suitable form of tire chain, indicated conventionally at 16. The body should be somewhat less in width than the distance between the side chains 17 of a conventional tire chain 16 in order that when such a tire chain is laid upon the body, with adjacent cross chains in the grooves 14, the side chains will be supported somewhat above the ground. Preferably, the body is formed in two symmetrical halves 18 and 19 by dividing it intermediate the length of the curved face 11 and the lower faces of the halves, adjacent their abutting ends, are cut-away as at 20 to receive the leaves of one or more hinges 21 by means of which the halves are connected. Because of this, when the device is not in use it may be folded into a relatively compact space for storage or for carriage in a vehicle.

In use, a tire chain is adjusted upon the open body of my device with adjacent cross links seating in the grooves 14 and the body of the device positioned with one end directly in front of and in alinement with the vehicle wheel to which the chain is to be applied. The vehicle is then run forwardly, either by force exerted upon it manually or by means of its motor, until the wheel rests upon the concave face 11 of the device when further movement of the vehicle is stopped and the chain brought about the wheel and fastened in the usual manner. After this, the vehicle is, of course, moved to bring the wheel off from the device which may then be folded and put away.

In Fig. 3 I have illustrated a somewhat modified form of invention, in which the longitudinally concave face 11 is not only concave longitudinally, but also transversely and in which the inclined faces 12 are concave transversely. This construction assists somewhat in insuring a proper running of the vehicle wheel onto the device. Again in this figure, I have illustrated the inclined faces as also being provided with transverse grooves to receive such cross chains of the tire chain as may be adjacent those located in the grooves at the ends of the concave middle face of the device. Obviously, the form of my invention illustrated in Fig. 1 may have its inclined faces concave, but not transversely grooved to receive chain links, or it may have its inclined faces transversely grooved to receive chain links but not concaved. The operation of all of these various forms will be identical and no further description is therefore believed to be necessary. I wish, however, to reserve the right to make any changes, within the scope of the appended claims, without in the slightest degree departing from the spirit of my invention.

Having thus described the invention, what is claimed as new is:

1. A device of the character described including a body formed in hinged sections to fold one upon the other and having downwardly and outwardly inclined terminal portions providing runways for a vehicle wheel, and an intermediate wheel supporting portion, the intermediate wheel supporting portion being transversely concaved.

2. A device of the character described including a body having downwardly and outwardly inclined terminal portions providing runways for a vehicle wheel, and an intermediate wheel supporting portion, the intermediate wheel supporting portion being transversely concaved and the body being formed with transverse grooves at the junctures of the intermediate and inclined portions adapted to receive the cross members of a tire chain.

3. A device of the character described including a body having downwardly and outwardly inclined terminal portions providing runways for a vehicle wheel, and an intermediate wheel supporting portion, and the body being provided at the junctures of its intermediate and inclined portions with transverse grooves adapted to receive the cross members of a tire chain.

4. A device of the character described including a body having downwardly and outwardly inclined end portions and an intermediate portion transversely concaved, the body being formed in symmetrical parts hingedly connected.

5. A device of the character described including a body adapted to support a vehicle wheel above the ground and having tire chain receiving grooves.

6. A device of the character described including a body having a downwardly and outwardly inclined end portion and tire chain receiving grooves.

7. A device of the character described including a body having downwardly and outwardly inclined end portions and an intermediate portion, the end portions being longitudinally concaved and the intermediate portion both longitudinally and transversely concaved, the body at the terminals of its intermediate portion being formed with transverse grooves.

8. A device of the character described including a body having downwardly and outwardly inclined end portions and an intermediate portion, the end portions being longitudinally concaved and the intermediate portion both longitudinally and transversely concaved, the body at the terminals of its intermediate portion being formed with transverse grooves and its inclined faces being formed with further grooves, each spaced from one of the first transverse grooves a distance substantially equal to the space between the first transverse grooves.

In testimony whereof I affix my signature.

JOHN C. SEITZ. [L. S.]